April 25, 1933.                H. E. IVES                1,905,716
         MAKING STEREOSCOPIC PARALLAX PANORAMAGRAMS
         FROM PSEUDOSCOPIC PARALLAX PANORAMAGRAMS
                  Filed April 3, 1931         2 Sheets-Sheet 1
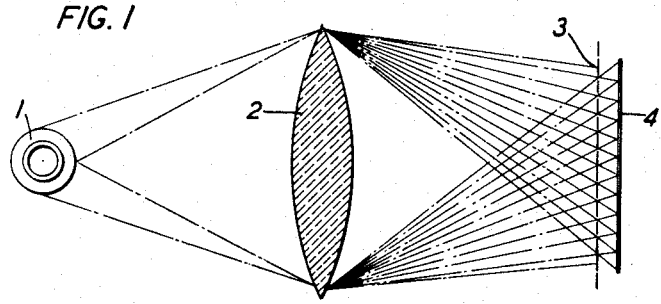
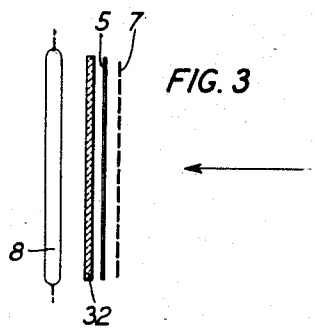
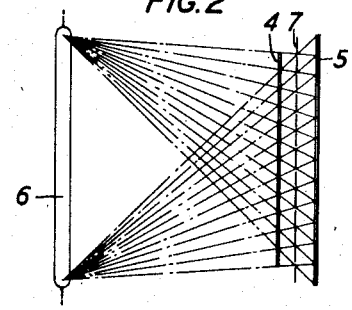
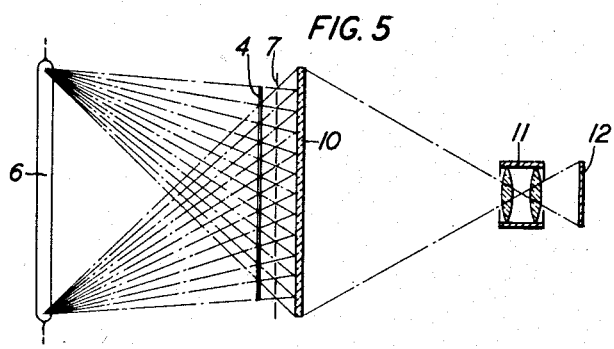
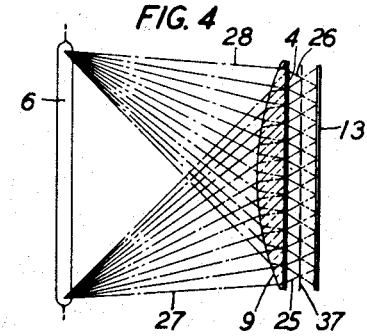
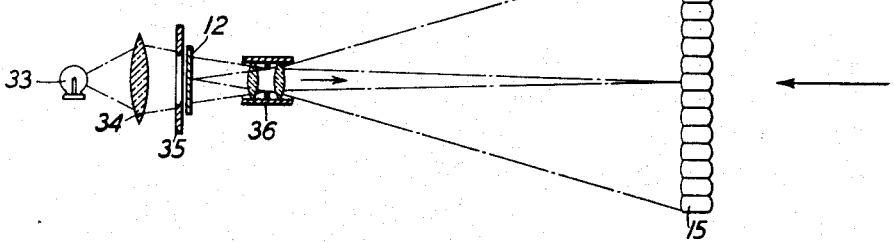
INVENTOR
H. E. IVES
BY
Stanley B. Kent.
ATTORNEY April 25, 1933.  H. E. IVES  1,905,716
MAKING STEREOSCOPIC PARALLAX PANORAMAGRAMS
FROM PSEUDOSCOPIC PARALLAX PANORAMAGRAMS
Filed April 3, 1931  2 Sheets-Sheet 2
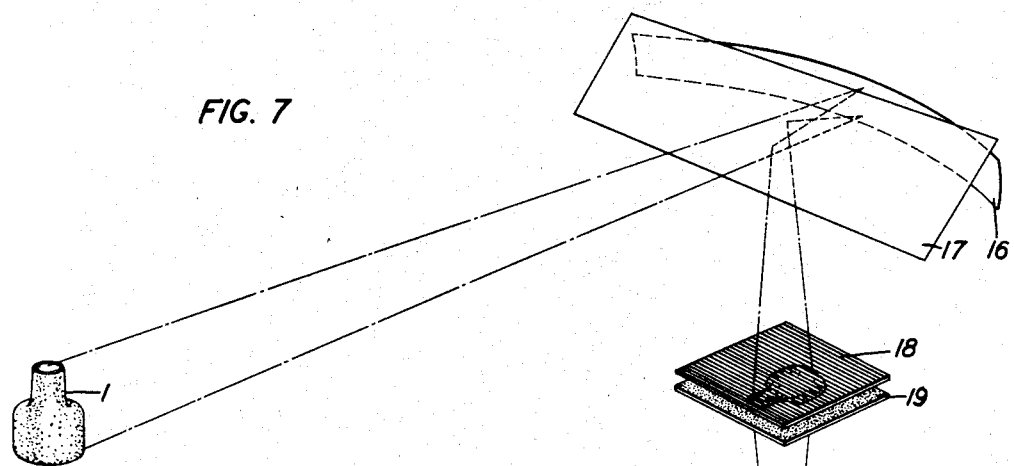
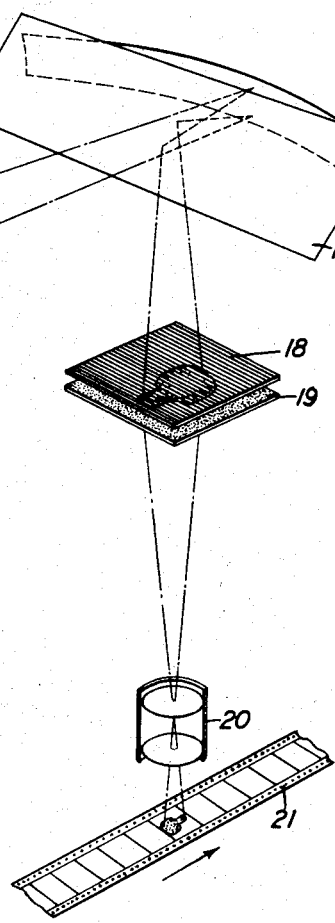
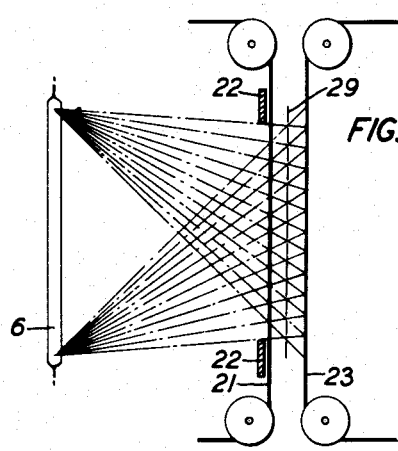
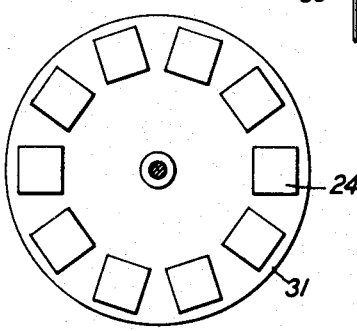
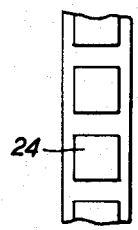
INVENTOR
*H. E. IVES*
BY
*Stanley B. Kent*
ATTORNEY Patented Apr. 25, 1933

1,905,716

UNITED STATES PATENT OFFICE

HERBERT E. IVES, OF MONTCLAIR, NEW JERSEY, ASSIGNOR TO BELL TELEPHONE LABORATORIES, INCORPORATED, OF NEW YORK, N. Y., A CORPORATION OF NEW YORK

MAKING STEREOSCOPIC PARALLAX PANORAMAGRAMS FROM PSEUDOSCOPIC PARALLAX PANORAMAGRAMS

Application filed April 3, 1931. Serial No. 527,378.

This invention relates to the producing of pictures in stereoscopic relief and more particularly to the producing of stereoscopic parallax panoramagrams for projection in stereoscopic relief.

An object of the invention is to provide a novel overall system for presenting pictures in stereoscopic relief.

Another object of the invention is to provide an arrangement for producing stereoscopic parallax panoramagrams from pseudoscopic parallax panoramagrams.

The invention is applicable to both still and motion pictures.

A feature of the invention is a complete system for presenting projected pictures in stereoscopic relief through the intermediary of pseudoscopic and stereoscopic parallax panoramagrams.

In one arrangement illustrative of the invention a pseudoscopic parallax panoramagram negative is produced by means of a large lens or mirror in conjunction with an opaque line grating or similar means. This pseudoscopic parallax panoramagram negative is then used to make a stereoscopic parallax panoramagram positive by shadow printing. This positive is then projected on a lenticular screen to produce pictures visible in stereoscopic relief.

The pseudoscopic parallax panoramagram negative photographed with large lens or mirror in such a manner that the images imprinted thereon are inverted right for left, is in the form of a transparent film with an infinity of elemental pseudoscopic strip images. A method of producing this type of pseudoscopic parallax panoramagram using a large lens is disclosed in a paper entitled "Parallax panoramagrams made with a large lens", by H. E. Ives, published in the June 1930 issue of the Journal of the Optical Society of America. Another method for producing a pseudoscopic parallax panoramagram using a large mirror is disclosed in a paper by the same author entitled "Parallax panoramagrams made with a large concave mirror", published in the November 1930 issue of the Journal of the Optical Society of America. To produce a stereoscopic parallax panoramagram positive from this pseudoscopic negative the latter is exposed to a line source of light positioned at right angles to the direction of the panoramagram strips of the pseudoscopic negative. A sensitive plate is placed behind the negative and interposed between the two is an opaque line grating like the grating $G_2$ shown on page 336 of the June 1930 issue of the Journal of the Optical Society of America, supra; the sensitive plate, grating, and negative being sufficiently separated to secure the parallax effect. The line source of light is of such length that a panoramic strip is shadowed through the grating onto the sensitive plate behind. In order that the peripheral panoramic strips shall print in proper position, the spacing of the grating, which is the distance between two adjacent transparent spaces between the opaque lines, must be properly chosen. In general, it will be somewhat greater than that of the grating used in making the negative. The exact spacing of the grating can, however, by altered by placing a convex lens, which may be spherical or cylindrical, in close contact with the negative and between it and the source of light. By making the lens of such strength that the rays retrace their original paths when the negative was made, panoramic strips free from distortion may be obtained.

A modification of the above arrangement for shadow printing is applicable where it is desired to produce a stereoscopic parallax panoramagram in reduced size, such as lantern slide or motion picture frame size. In this modification, the light sensitive plate of the above arrangement is replaced by a fine translucent diffusing glass sheet on which the shadow image is formed. This image is then photographed, by means of a high quality short focus lens, upon a light sensitive plate, in any desired size, such as lantern slide or motion picture frame size.

These stereoscopic parallax panoramagram pictures of reduced size are suitable for projection in relief upon a light diffusing viewing screen of the type disclosed in Patent No. 1,883,290 of H. E. Ives, issued October 18, 1932. An intermittent projection device might be used for intermittently projecting a series of these stereoscopic parallax panoramagrams upon a viewing screen in a public place for advertising purposes.

Stereoscopic parallax panoramagrams, too large for motion picture or lantern slide projection, may be viewed in relief by illuminating the stereoscopic positive transparency from one side with any suitable light source and placing an opaque line grating on the opposite side of the transparency. Observers then viewing the illuminating transparency through the grating will see pictures in stereoscopic relief.

The use of a narrow line of light in these arrangements is for the purpose of casting sharp shadows in the direction at right angles to the parallax panoramagram strips. In the direction across the strips a line of light is the equivalent of a series of point sources. It might be replaced by a moving point source.

The invention also contemplates the production of pseudoscopic parallax panoramagrams from stereoscopic parallax panoramagrams by shadow printing.

The invention will now be described more in detail having reference to the accompanying drawings.

Fig. 1 is a diagrammatic showing of an arrangement for taking pseudoscopic parallax panoramagram pictures;

Fig. 2 is a diagrammatic showing of an arrangement for producing stereoscopic parallax panoramagram pictures from pseudoscopic parallax panoramagram pictures;

Fig. 3 is a diagrammatic showing of an arrangement for viewing stereoscopic parallax panoramagram pictures in stereoscopic relief;

Fig. 4 is a diagrammatic showing of a modification of the apparatus shown in Fig. 2 for producing a stereoscopic parallax panoramagram from a pseudoscopic parallax panoramagram of the same size;

Fig. 5 is a diagrammatic showing of an arrangement for producing stereoscopic parallax panoramagrams in reduced size from pseudoscopic parallax panoramagrams;

Fig. 6 is a diagrammatic showing of an arrangement for projecting stereoscopic parallax panoramagrams for viewing in stereoscopic relief;

Fig. 7 is a perspective showing of an arrangement for producing pseudoscopic parallax panoramagram pictures on motion picture film using a large mirror;

Fig. 8 is a diagrammatic showing of an arrangement for producing stereoscopic parallax panoramagram pictures on motion picture film, from pseudoscopic parallax panoramagram pictures, such as are produced in Fig. 7;

Fig. 9 is a diagrammatic showing of an arrangement for intermittently projecting a series of stereoscopic parallax panoramagram pictures for viewing in relief as for advertising purposes;

Fig. 10 is a detailed showing of apparatus shown in Fig. 9; and

Fig. 11 is a detailed showing of a modification of apparatus shown in Fig. 9.

Like reference characters are used to designate identical elements in the several figures.

Referring now to Fig. 1 a large diameter lens 2 is arranged to form an image of an object 1 through a wide angle of view and to project this image through an opaque line grating 3 upon a light sensitive emulsion 4. The lens 2 is so large that it can look around the object 1 so that the image formed in the space occupied by the emulsion 4 is a composite image of the object 1 as viewed from different directions. The opaque line grating 3 serves to divide the image projected by the lens 2 into a plurality of strip images which are received on the light sensitive emulsion 4 to form a pseudoscopic parallax panoramagram picture of the object 1. A similar arrangement of large lens, opaque line grating, and emulsion, for producing pseudoscopic parallax panoramagrams is disclosed in the paper by H. E. Ives entitled "Parallax panoramagrams made with a large lens", supra.

The pseudoscopic parallax panoramagram of Fig. 1 is used to produce a stereoscopic parallax panoramagram in the arrangement of Fig. 2.

Referring now to Fig. 2, the developed emulsion 4 carrying the pseudoscopic parallax panoramagram picture is positioned in front of an opaque line grating 7 and another light sensitive emulsion 5. These three elements are arranged in the order shown with the opaque line grating 7 interposed between the pseudoscopic parallax panoramagram 4 and the unexposed light sensitive emulsion 5. The elements are sufficiently separated from each other to give the parallax effect. A line source of light 6 is positioned at a suitable distance from the pseudoscopic parallax panoramagram emulsion 4 and at right angles to the direction of the panoramic strips of this emulsion. This line of light is of such length that a panoramic strip of the pseudoscopic parallax panoramagram emulsion 4 is shadowed through the opaque line grating 7 onto the light sensitive emulsion 5. In order that the peripheral panoramic strips of the pseudoscopic parallax panoramagram emulsion 4 shall print in the desired position, the spacing of the opaque line grating 7 must be properly chosen. In general, the spacing of the grating 7 will be somewhat greater than that of the grating 3, Fig. 1, used in making the pseudoscopic parallax panoramagram picture on the emulsion 4. The strip images of the pseudoscopic parallax panoramagram picture on the emulsion 4 are inverted right for left and when these strip images are projected by the line source of light 6 through the grating 7 onto the emulsion 5 they are reversed with respect to the object picture and form on the emulsion 5 a stereoscopic parallax panoramagram picture corresponding to the pseudoscopic parallax panoramagram picture on the emulsion 4 and slightly larger than the latter.

The term "stereoscopic parallax panoramagram" as used in this specification signifies a parallax panoramagram which has an orientation of the elemental portions of each panoramic strip such as is obtained by exposing a photographic emulsion through an opaque line grating fixed with respect to the emulsion and slightly separated from it by means of a lens moved around the object; that is, the element of any panoramic strip corresponding to the right hand aspect of the object is located nearest to the left hand side of the object as pictured.

Referring now to Fig. 3 the steroscopic parallax panoramagram emulsion 5 produced in Fig. 2 and developed in any well known manner, is illuminated by any suitable source of light 8 and diffusing plate 32. An opaque line grating 7 of large spacings, like the one in Fig. 2, is positioned on the opposite side of the emulsion 5. An observer viewing the illuminated stereoscopic parallax panoramagram emulsion 5 through the opaque line grating 7 in the direction indicated by the arrow sees a picture in stereoscopic relief.

A modification of the shadow printing arrangement of Fig. 2 is shown in Fig. 4. This arrangement is similar to that shown in Fig. 2 and has as an addition a large convex lens 9, which may be either spherical or cylindrical, placed in contact with the pseudoscopic parallax panoramagram emulsion 4. The use of this lens 9 requires a different spacing of the grating 37 than is required of the grating 7 in Fig. 2. The spacing of the grating 37 corresponds to the width of the panoramic strips on the emulsion 4 which is a little larger than the spacing of the grating 3. The use of this lens 9 and grating 37 with the line of light 6 produces a steroscopic parallax panoramagram on the emulsion 13, the same size as the pseudoscopic parallax panoramagram on the emulsion 4. The lines 25 and 26 in Fig. 4 show that peripheral light rays 27 and 28 incident upon the large lens 9 are redirected or bent toward the center axis of the lens 9 so that they will print in the desired position on the emulsion 13. By making the lens 9 of such strength that the light rays retrace their original paths when the negative was made, panoramic strips free from distortion are obtained on the emulsion 13, and in a subsequent viewing of the emulsion 13 through a grating as in Fig. 3 the spacing of the grating must be smaller than the spacings used originally in the taking grating 3.

In Fig. 5 is shown another modification of the shadow printing apparatus of Fig. 2. This arrangement is applicable where a picture is desired for projection in stereoscopic relief using a lenticular transmitting rod screen for viewing, the purpose of the arrangement in Fig. 5 being to produce a stereoscopic parallax panoramagram picture in reduced size, such as lantern slide or motion picture frame size. In this exemplification the light sensitive emulsion 5 of Fig. 2 is replaced by a fine diffusing plate 10 such as a sheet of ground glass or celluloid, on which a stereoscopic parallax panoramagram shadow image of the pseudoscopic parallax panoramagram emulsion 4 is formed. This image is photographed in reduced size by means of the short focus high quality photographic lens 11, upon the light sensitive emulsion 12, which may be a motion picture film. The picture produced on the emulsion 12 is a stereoscopic parallax panoramagram identical with that produced on the emulsion 5 of Fig. 2, except in reduced size. For viewing the stereoscopic parallax panoramagram picture on the emulsion 12 a projector and viewing screen such as shown in Fig. 6 are employed.

Referring now to Fig. 6 the stereoscopic parallax panoramagram picture film 12 of Fig. 5 is mounted in front of a source of light 33, a lens 34, and a diaphragm 35. This arrangement in conjunction with the lens 36 causes an image of this panoramagram 12 to be projected upon the rear ridged surface 14 of the diffusely transmitting screen 15. Observers viewing the screen in the direction of the arrow see pictures in stereoscopic relief. For further details of this projection screen reference may be had to Patent No. 1,883,290, supra.

In Fig. 7 there is shown an arrangement comprising a large diameter concave strip mirror and a semi-transparent reflector for making pseudoscopic parallax panoramagram pictures of an object upon a motion picture film. This is a modification of the taking arrangement using a large lens, as shown in Fig. 1. In both arrangements a pseudoscopic parallax panoramagram picture is produced. The large concave mirror 16 in Fig. 7 reflects light rays from the object 1 upon a semi-transparent reflector 17 positioned at 45° to mirror 16. The reflector 17 in turn reflects these light rays through an opaque line grating 18 to form an image of the object 1 upon a light diffusing member 19. For a more detailed description of this apparatus reference may be had to the paper by H. E. Ives entitled "Parallax panoramagrams made with a large concave mirror", supra. The image formed on the diffusing plate 19 is photographed by the short focus lens 20 upon the motion picture film 21. The picture formed on film 21 is a pseudoscopic parallax panoramagram. To produce a stereoscopic parallax panoramagram from this pseudoscopic parallax panoramagram the projection apparatus in Fig. 8 is employed.

Referring now to Fig. 8 the pseudoscopic parallax panoramagram film 21 is positioned in front of a line source of light 6 positioned at right angles to the direction of the panoramic strips on the film 21 and in parallelism with the light sensitive motion picture film 23. An opaque line grating 29 is interposed between the films 21 and 23. The pseudoscopic parallax panoramagram pictures on film 21 are shadow printed upon the film 23 by projection in the same manner as described above in connection with Fig. 2. The two films 21 and 23 may be moved downward in a step-by-step manner by any suitable means, one stereoscopic parallax panoramagram picture being produced at a time on film 23. The aperture forming members 22 permit only one picture frame to be exposed at one time to the line of light 6. The film 21 must be moved transversely instead of vertically through the taking camera to cause a horizontal rather than a vertical positioning of the panoramic strips, so that the vertically positioned line of light 6 as shown in Fig. 8 will be at right angles to the direction of the panoramic strips. A shutter not shown controls the time of exposure and prevents exposure during movement of the film. The stereoscopic parallax panoramagram pictures produced on the film 23 may be projected by a motion picture projector in accordance with the projection arrangement shown in Fig. 6 and described above. In this case an observer viewing the screen 15 in Fig. 6 would see motion pictures in stereoscopic relief. This system is just as applicable to still pictures, such as lantern slides, as it is to motion pictures.

Fig. 9 shows an arrangement for projecting intermittently a series of stereoscopic parallax panoramagram pictures produced by any of the means shown in the preceding figures. In this arrangement the same projection means shown in Fig. 6 is used to project a series of stereoscopic parallax panoramagram pictures 24 upon the lenticular transmitting screen 15. The parallax panoramagram pictures 24 are mounted in series arrangement upon a panel 30 which is moved upward and downward in an intermittent manner by any suitable means so that one picture at a time is projected upon the screen 15. The screen 15 is the same as the screen shown in Fig. 6 and described above. It is viewed from the direction of the arrow. This intermittent display of pictures in stereoscopic relief would be applicable for advertising purposes in any public place, such as a railroad station waiting room, a store display window, or the like.

In Fig. 10 there is shown a front view of the arrangement of the stereoscopic parallax panoramagram pictures 24 upon an elongated strip which for projection would be moved upward and downward as described in connection with Fig. 9.

In Fig. 11, which shows an alternative arrangement of mounting the stereoscopic parallax panoramagram pictures 24, a disc 31 is employed, around the periphery of which are mounted the stereoscopic parallax panoramagram pictures 24. For projection of the pictures 24 the disc 31 would be rotated in a step-by-step manner by any suitable means, in front of the projector shown in Fig. 9. The rotation of the disc could be continuous in one direction or periodically reversed.

The scope of this invention is to be limited only by the appended claims.

What is claimed is:

1. In a system for producing pictures in stereoscopic relief, means to produce a parallax panoramagram of an object, pictures of which are to be viewed in stereoscopic relief, means to produce from said parallax panoramagram another parallax panoramagram of different type, and means utilizing said second parallax panoramagram to produce a picture visible in stereoscopic relief.

2. In a system for producing pictures in stereoscopic relief, means to produce a pseudoscopic parallax panoramagram of an object pictures of which are to be viewed in stereoscopic relief, means to produce a stereoscopic parallax panoramagram from said pseudoscopic parallax panoramagram, and means utilizing said stereoscopic parallax panoramagram to produce a picture visible in stereoscopic relief.

3. In a system for producing pictures in stereoscopic relief, means for making a pseudoscopic parallax panoramagram picture of an object, means for shadow printing said pseudoscopic picture to produce a stereoscopic parallax panoramagram picture, and means for projecting said stereoscopic picture to produce a picture visible in stereoscopic relief.

4. A system for producing pictures in stereoscopic relief, comprising means for producing a pseudoscopic parallax panoramagram picture of an object, means for projecting strip images of said pseudoscopic parallax panoramagram picture to form a stereoscopic parallax panoramagram picture, and means for presenting said stereoscopic parallax panoramagram picture for viewing in relief.

5. A system for producing pictures in stereoscopic relief, comprising means for producing a pseudoscopic parallax panoramagram picture of an object, a screen positioned back of said picture having a plurality of minute apertures registering with the strips of said picture, means for projecting said picture through said plurality of apertures upon a light sensitive emulsion positioned back of said screen to form a stereoscopic parallax panoramagram, and means for projecting said stereoscopic parallax panoramagram for viewing in relief.

6. A system for producing pictures in stereoscopic relief, comprising means for producing a pseudoscopic parallax panoramagram picture of an object, an opaque line grating, means for projecting said picture through said opaque line grating to form a stereoscopic parallax panoramagram picture, and means for projecting said stereoscopic parallax panoramagram picture for viewing in stereoscopic relief.

7. A system for producing pictures for viewing in relief, comprising means for producing a pseudoscopic parallax panoramagram picture of an object, an opaque line grating, means for projecting strip images of said pseudoscopic parallax panoramagram picture through said opaque line grating to form a stereoscopic parallax panoramagram picture, means interposed between said opaque line grating and said projection means to cause the peripheral strip images of said pseudoscopic parallax panoramagram to print in proper positions upon said stereoscopic parallax panoramagram, and means to project said stereoscopic parallax panoramagram for viewing in relief.

8. In a system for producing pictures in stereoscopic relief, an opaque line grating, and a large lens for producing upon a light sensitive plate a pseudoscopic parallax panoramagram, a second opaque line grating, and a line source of light for shadow printing said pseudoscopic parallax panoramagram through said second grating upon a second light sensitive plate to form a stereoscopic parallax panoramagram, and means for projecting said stereoscopic parallax panoramagram upon a lenticular screen for viewing in stereoscopic relief.

9. Apparatus for producing stereoscopic parallax panoramagrams, comprising a large concave strip mirror for forming an image of an object, an opaque line grating, and a translucent plate, a semi-transparent reflector for reflecting upon said translucent plate through said grating the image formed by said mirror, means for photographing in desired size upon a light sensitive emulsion the image produced upon said translucent plate, a second opaque line grating, and means for shadow printing through said grating upon a second light sensitive emulsion the image formed on said first emulsion.

10. In a system for producing pictures in stereoscopic relief, a translucent screen, means for forming a plurality of strip images of an object from different points of view upon said translucent screen, means for photographing said images in reduced size upon a light sensitive film to form a pseudoscopic parallax panoramagram picture, an opaque line grating, means for projecting strip images of said pseudoscopic parallax panoramagram through said opaque line grating upon a second light sensitive film to form a stereoscopic parallax panoramagram picture, and means for projecting said stereoscopic parallax panoramagram to produce a picture visible in stereoscopic relief.

11. A system for producing pictures in stereoscopic relief, comprising means for producing a pseudoscopic parallax panoramagram picture of an object, means for shadow printing said pseudoscopic parallax panoramagram to produce a stereoscopic parallax panoramagram, means for photographing said stereoscopic parallax panoramagram in reduced size, and means for intermittently projecting a series of said reduced size stereoscopic parallax panoramagrams upon a lenticular screen for viewing in stereoscopic relief.

12. Apparatus for producing stereoscopic parallax panoramagrams, comprising a pseudoscopic parallax panoramagram, an opaque line grating interposed between a light sensitive emulsion and said panoramagram, said elements being separated sufficiently to produce a parallax effect, and a line source of light positioned at right angles to the direction of the panoramic strips of said pseudoscopic parallax panoramagram, said line of light being of such length that said panoramic strips are shadowed through the line grating upon said light sensitive emulsion.

13. Apparatus for producing pictures in stereoscopic relief, comprising a parallax panoramagram, an opaque line grating interposed between a light sensitive emulsion and said panoramagram, said elements being separated sufficiently to produce a parallax effect, means to illuminate said panoramagram so that light therefrom passing through said grating produces another parallax panoramagram on said light sensitive emulsion.

14. Apparatus for producing stereoscopic parallax panoramagrams, comprising a pseudoscopic parallax panoramagram formed by a plurality of strip images of an object, an opaque grating of larger spacing than the width of the strip images of said panoramagram interposed between a light sensitive emulsion and said panoramagram, said emulsion being positioned to receive light from the strip images of said pseudoscopic parallax panoramagram after passing through said grating, to form a stereoscopic parallax panoramagram.

15. Apparatus for printing parallax panoramagrams comprising, a parallax panoramagram, means to image each panoramic strip of said parallax panoramagram separately on a light sensitive emulsion, the image forming light beams traversing individual paths in the space between said parallax panoramagram and light sensitive emulsion.

16. Apparatus for producing a stereoscopic strip image of an object from a pseudoscopic strip image, comprising a pseudoscopic strip image, an opaque line grating interposed between a light sensitive emulsion and said strip image, and a source of light directed toward said strip image for shadow printing said pseudoscopic image through said grating upon said light sensitive emulsion to form a stereoscopic image.

17. Apparatus for producing stereoscopic parallax panoramagrams, comprising a pseudoscopic parallax panoramagram, an opaque line grating interposed between a light sensitive emulsion and said panoramagram, said elements being separated sufficiently to produce a parallax effect, a convex lens coincident with said panoramagrams on the side away from said grating, and a line source of light positioned at right angles to the direction of the panoramic strips of said panoramagram, said line of light being of such length that said panoramic strips are shadowed through the line grating upon said light sensitive emulsion, and said convex lens being positioned to direct the peripheral rays from said line of light toward the optical axis of said lens.

18. Apparatus for producing stereoscopic parallax panoramagrams, comprising a translucent diffusing plate, a pseudoscopic parallax panoramagram, an opaque line grating interposed between said plate and panoramagram, said elements being separated sufficiently to produce a parallax effect, a line source of light positioned at right angles to the direction of the panoramic strips of said stereoscopic parallax panoramagram, said line of light being of such length that said panoramic strips are shadowed through the line grating upon said diffusing plate to form thereon a stereoscopic parallax panoramagram, and means for photographing said stereoscopic parallax panoramagram in any desired size upon a light sensitive emulsion.

19. Apparatus for producing pictures in stereoscopic relief, comprising means for producing pseudoscopic strip images of an object, an opaque line grating positioned opposite and slightly separated from said strip images, and a line source of light positioned at a suitable distance from said strip images and on the side away from said grating to project the strip images upon a light sensitive plate suitably positioned opposite said grating.

20. The method of producing a projected picture visible in stereoscopic relief, which comprises photographing an object to produce a parallax panoramagram, forming from said parallax panoramagram another parallax panoramagram of a different type, the two types differing in that if both are viewed in the same manner to produce pictures visible in relief, the picture produced by one type will be visible in stereoscopic relief while that of the other type will be visible in pseudoscopic relief, and projecting the picture of such second parallax panoramagram on a screen which renders the projected picture visible in stereoscopic relief.

21. The method of producing a projected picture visible in stereoscopic relief, which comprises photographing an object to produce a pseudoscopic parallax panoramagram, shadow printing said pseudoscopic panoramagram to produce a stereoscopic parallax panoramagram, and projecting the picture of such stereoscopic panoramagram on a screen which renders the projected picture visible in stereoscopic relief.

In witness whereof, I hereunto subscribe my name this 31st day of March, 1931.

HERBERT E. IVES.